United States Patent
Basilier et al.

(10) Patent No.: US 6,728,536 B1
(45) Date of Patent: Apr. 27, 2004

(54) METHOD AND SYSTEM FOR COMBINED TRANSMISSION OF ACCESS SPECIFIC ACCESS INDEPENDENT AND APPLICATION SPECIFIC INFORMATION OVER PUBLIC IP NETWORKS BETWEEN VISITING AND HOME NETWORKS

(75) Inventors: Henrik Basilier, San Diego, CA (US); Ulf Gustafson, San Francisco, CA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/562,682

(22) Filed: May 2, 2000

(51) Int. Cl.[7] ................................................ H04Q 7/20
(52) U.S. Cl. ..................... 455/432; 455/422; 455/433; 455/435; 455/436; 455/560; 455/434; 370/328; 709/201; 709/236
(58) Field of Search ...................... 455/422, 432, 455/433, 434, 435, 436; 370/328, 331, 395.52; 709/201, 208, 217, 220, 227, 230, 236, 238, 245, 249

(56) References Cited

U.S. PATENT DOCUMENTS

| | | | | |
|---|---|---|---|---|
| 5,680,440 | A | * 10/1997 | Ghisler et al. | 455/432 |
| 5,805,997 | A | * 9/1998 | Farris | 379/221.08 |
| 5,862,481 | A | * 1/1999 | Kulkarni et al. | 455/432 |
| 5,884,169 | A | 3/1999 | Uchiyama et al. | 455/433 |
| 6,038,442 | A | * 3/2000 | Ueda et al. | 379/211.02 |
| 6,101,387 | A | * 8/2000 | Granberg et al. | 455/414 |
| 6,163,843 | A | * 12/2000 | Inoue et al. | 713/201 |
| 6,181,935 | B1 | * 1/2001 | Gossman et al. | 455/432 |
| 6,188,899 | B1 | * 2/2001 | Chatterjee et al. | 455/435 |
| 6,198,933 | B1 | * 3/2001 | Lundin | 455/432 |
| 6,223,035 | B1 | * 4/2001 | Pierce et al. | 455/426 |
| 6,272,129 | B1 | * 8/2001 | Dynarski et al. | 370/356 |
| 6,353,607 | B1 | * 3/2002 | Valentine et al. | 370/349 |
| 6,453,162 | B1 | * 9/2002 | Gentry | 455/433 |
| 2001/0012779 | A1 | * 8/2001 | Skog | 455/436 |

FOREIGN PATENT DOCUMENTS

| | | |
|---|---|---|
| EP | 1089580 A2 | 4/2000 |
| WO | WO 98/43446 | 10/1998 |
| WO | WO 99/14910 | 3/1999 |

OTHER PUBLICATIONS

C. deLatt et al., Generic AAA Architecture, 11/99, slides 1–26.*
The Internet NG Project, excerpt from "Accounting Technology", last updated Nov. 1, 1999, pp. 1–2.*

* cited by examiner

Primary Examiner—William Trost
Assistant Examiner—Stephen D'Agosta
(74) Attorney, Agent, or Firm—Coats & Bennett, PLLC

(57) ABSTRACT

A method and system for transmitting specific information, such as access specific roaming information and/or application specific information, between a home network and a visiting access network is provided. The home network and visiting network are capable of communicating access independent information in a protocol, such as a AAA protocol. The access and/or application specific information is formatted in the AAA protocol. The access and/or application specific information is then transmitted over a public IP network between the home network and the visiting network. A system is provided for transmitting access and/or application information between a visiting network and a home network over a public IP network. A control access server in the visiting access network formats the access information using a secure AAA protocol to form formatted access information. An application server formats application specific information. A AAA-F server associated with the visiting network transmits the formatted access and/or application information over the public IP network to the home network.

23 Claims, 2 Drawing Sheets

METHOD AND SYSTEM FOR COMBINED TRANSMISSION OF ACCESS SPECIFIC ACCESS INDEPENDENT AND APPLICATION SPECIFIC INFORMATION OVER PUBLIC IP NETWORKS BETWEEN VISITING AND HOME NETWORKS

BACKGROUND OF THE INVENTION

The present invention relates generally to methods and systems for providing roaming among communications systems, and more particularly, to a method and system for transmitting access specific and/or application specific information from a visiting access network to a home network using public internet protocol networks.

A variety of wireless mobile communication systems now cover a large portion of the world's surface. Such an expansive coverage is accomplished by a number of different networks operating in specific locations throughout the world. These multiple networks unfortunately also have multiple access types. In order to service users while traveling, or roaming, in other networks, service providers have had to develop methods for providing service to their subscribers while in other networks.

One method for handling the problem of multiple access types is to provide an architecture for separating access specific aspects of roaming from the access independent aspects of roaming. One such architecture has been defined in cdma2000 wherein terminal equipment is authenticated through an access specific means and user registration is accomplished through an access independent means.

In current methods, the two access means are physically separated in the architecture. In the above example, the terminal equipment authentication is performed using specific protocols over the public switched telephone network (PSTN) or a private (protected) network. Security is therefore enforced by isolating the communication path from unauthorized access.

The user conversely is typically authenticated using internet protocol (IP) based protocols running over a shared public IP network. For example, a user will typically have a home IP network from which service is provided. When roaming to other networks, or "visited access networks", the user may still want to receive service. The visited access network contains a function called AAA-F. The AAA-F stores information about roaming partners and/or available brokers. The home network contains a function designated AAA-H which has a database of all subscribers and performs the authentication of a user.

Between the home network and a visited access network a number of broker functions, designated AAA-B, may be present. Access independent information is typically transmitted between the AAA functions over a public IP network. These transmissions are secured by the use of shared secrets and encryption and eventually a Public Key Infrastructure.

Unfortunately, the use of PSTN networks and private networks increases costs for service providers and reduces the scalability of their systems. Accordingly, there is a need for a method and system which does not use PSTN or private networks to carry signaling information for roaming, which employs public IP networks to transmit access specific and/or application specific information between networks and which transmits the access specific and/or application specific information using available protocols.

SUMMARY OF THE INVENTION

This need is met by the method and system of the present invention in which specific information, which may be access specific and/or application specific information is transmitted between visiting and home networks using public IP networks.

In accordance with one aspect of the present invention, a method for transmitting specific information between a home network and a visiting access network is provided. Specific information may comprise access specific roaming information and/or application specific information. The home network and visiting access network are capable of communicating access independent roaming information in a protocol, such as a AAA protocol with AAA encryption. The specific information is formatted in the protocol. The specific information is then transmitted over a public IP network between the home network and the visiting network.

The specific information may be registration or authentication information. The AAA protocol may be a DIAMETER protocol. The step of formatting the specific information in a AAA protocol may comprise the step of encrypting the specific information at an access control server in the visiting network. Alternatively, for application specific information, encryption may be performed by an application server. The method may comprises the steps of transmitting the encrypted specific information from the visiting network to the home network and decrypting the encrypted specific information at the home network. Depending upon the relationship between the visiting network and the home network, the formatted specific information may be transmitted to a broker AAA server. The broker AAA server then routes the formatted specific information to a HLR for access specific information, or to a application home server for application specific information, based on routing information in the broker AAA server.

In accordance with another aspect of the present invention, a method for providing access specific and access independent roaming capabilities between a home access network and a visiting access network is provided. The method comprising the steps of: encrypting the access specific information in a secure protocol at an access control server in the visiting access network to form formatted access specific information; providing the formatted access specific information to an AAA-F server associated with the visiting access network; transmitting the formatted access specific information to the home access network over a public IP network and decrypting the access specific information at the home access network.

In accordance with another aspect of the present invention, a method is provided for transmitting application specific information between a visiting network and a home network. The home network and visiting network are capable of communicating access independent roaming information in a protocol, such as a AAA protocol with AAA encryption. The application specific information is formatted in the protocol. The application specific information is then transmitted over a public IP network between the home network and the visiting network.

In accordance with yet another aspect of the present invention, a system for transmitting specific information, such as access specific roaming information and/or application specific information, between a visiting network and a home network over a public IP network is provided. The system includes a server associated with the visiting network for formatting the specific information using a secure AAA protocol to form formatted specific information. A AAA-F server associated with the visiting network transmits the formatted specific information over the public IP network to the home network.

The system may further comprise a HLR server associated with the home network for receiving formatted access specific information and for providing the formatted specific information to the home network. A broker network may receive the formatted specific information from the public IP network and route the formatted specific information over the public IP network to the home network. The access control server may provide an international mobile subscriber identity in the access specific information which identifies the AAA-H server.

These and other features and advantages of the present invention will become apparent from the following detailed description, the accompanying drawings and the appended claims.

BRIEF DESCRIPTION OF THE DRAWINGS

The foregoing and other advantages of the invention will become apparent upon reading the following detailed description and upon reference to the drawings in which.

DETAILED DESCRIPTION OF THE INVENTION

Figure 1:
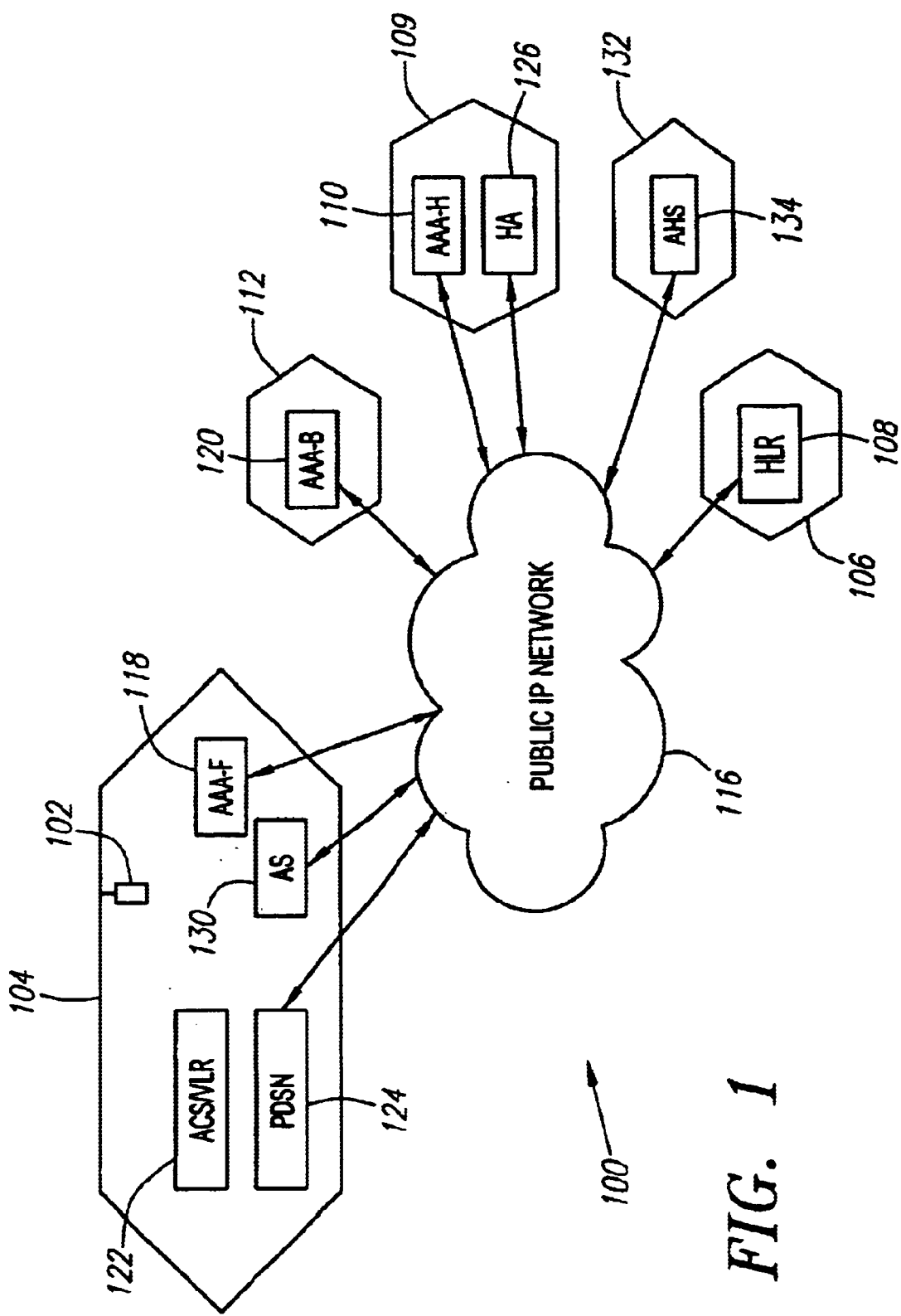
FIG. 1 is schematic diagram of a system in accordance with the present invention including AAA-F and AAA-H servers which are used to communicate access specific, access independent and application specific information over public IP networks between a visited network and a home network.

A system 100 which uses public IP networks to communicate access specific, access independent and application specific information as a user, or mobile terminal 102, roams in a visited access network 104 in accordance with the present invention is shown in FIG. 1. A home access network 106, such as a cdma2000 network, provides wireless service to the user 102. As is known, the home access network 106 is associated with a Home Locator Register (HLR) 108 which stores information relating to subscribers of the network service which is used to identify and verify subscribers. The HLR 108 also stores information regarding features and services subscribed to by each subscriber. A home IP network 109 has an associated Authentication, Authorization and Accounting (AAA-H) function 110.

A broker network 112 is shown connected to a public IP network 116. As will be apparent to those skilled in the art, a broker network may or may not be needed to provide service to the mobile terminal 102 depending upon the relationship between the home access network 106 and the visited access network 104. The public IP network 116 supports communications between the various components of the system 100 as discussed more fully below.

Similar to the AAA-H function 110, the visited access network 104 and the broker network 112 are associated with a AAA-F function 118 and a AAA-B function 120, respectively. The various AAA functions communicate with each other using an appropriate encryption method (AAA protocol encryption) and a specified AAA protocol format.

In addition, the visited access network 104 contains an access control server/visitors' location register (ACS/VLR) 122 which requests information from the HLR 108 and stores that information as long as the mobile terminal 102 is roaming in the visited network 104. A packet data serving node (PDSN) 124 in the visited access network 104 supports packet communications. A home agent (HA) 126 in the home IP network 109 provides mobile IP based packet data services to the mobile terminal 102. Both the PDSN 124 and the HA 126 are known in the art and, as such, details of their operation will be not given herein.

In accordance with the present invention, application specific information may be transmitted over the public IP network 116. An application server (AS) 130 is provided in the visited network 104 for transmitting, encrypting and receiving application information. An application home network 132 contains an application home server (AHS) 134 which stores and provides information relating to applications subscribed to by the user. Although the discussion below will be directed primarily to the transmission of access specific information, the application specific information may be transmitted in a similar manner similar in accordance with the present invention.

The specific configuration of the system 100 shown in FIG. 1 is exemplary and may take many other forms. For example, many of the components may be included, or part of, other components. The AAA-F 118, the AAA-H 110 and/or the AAA-B 120 may be stored on a single server. Further, the home IP network 109 and the public IP network 116 may be a single IP network or be part of the home access network 106. In addition, numerous communications paths between the various components of the system 100 have not been shown for clarity and ease of description.

The present invention advantageously uses, to a large extent, the framework built for access independent roaming. This is done by running access specific (and/or application specific) protocols for roaming on top of the generic access independent solutions already in place. An example from the wireless world would be to run for example mobile application part (MAP) or American National Standards Institute standard 41 (ANSI-41) on top of the AAA protocol. The AAA protocol may be a known DIAMETER protocol.

Advantageously, in accordance with an aspect of the present invention, the access specific part in both the visited access network and the home access network communicate with the AAA-F using a shared public IP network and the AAA protocol. Thus, the protocol implementations and AAA mechanisms which are currently used for the access independent portions may be reused for access specific portions in accordance with the present invention. Existing access independent roaming agreements may be also reused for access specific roaming with the proper reconfiguration of the AAA servers 118, 120 and 110.

Figure 2:
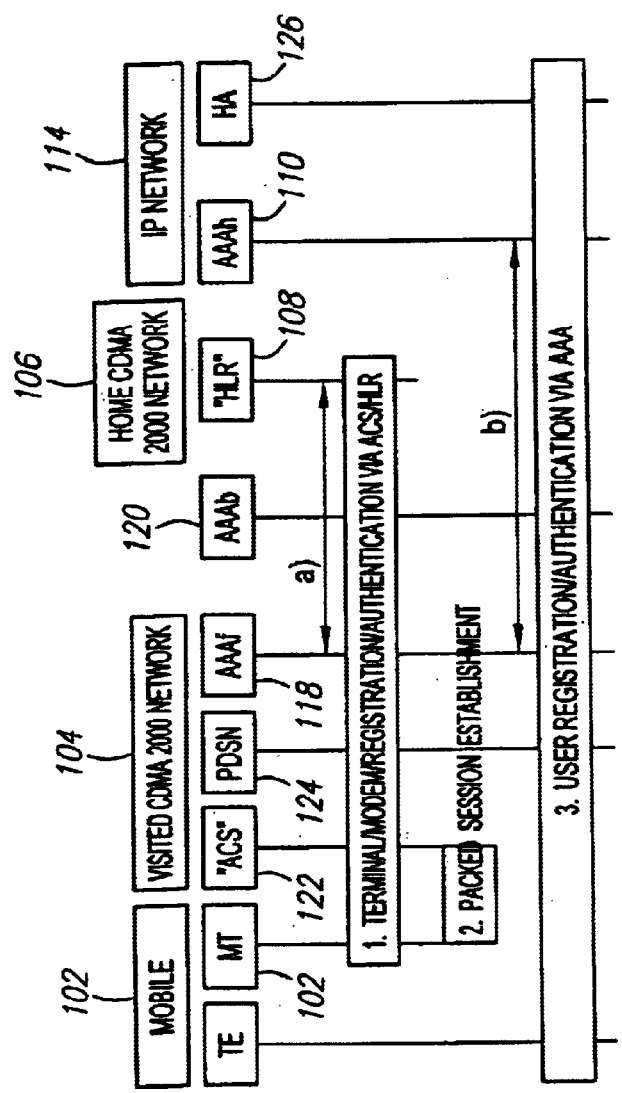
FIG. 2 is a graphical representation of message transmission between various components of the system shown in FIG. 1.

With reference to FIG. 2, exemplary operation in accordance with the present invention will now be described. For this example, the mobile terminal 102 is a code division multiple access (CDMA) terminal and the networks 104 and 106 are respectively a visited cdma2000 network and a home cdma200 network. A user wishes to use the mobile terminal 102 in the visited cdma2000 network 104 which has a roaming agreement with the home cdma2000 network 106. In addition, the AAA-F 118 contains routing information relating to the mobile terminal 102. In initiating communications, the mobile terminal 102 registers in the visited network 104 by any proper means, such as power up, implicit, or the like.

The ACS/VLR 122 assembles an ANSI-41 registration, and/or authentication, message in an AAA protocol format with AAA protocol encryption. The ACS/VLR 122 then sends the formatted registration message to the AAA-F 118. Using a Network Access Indicator (NAI) field of the AAA protocol, the AAA-F 118 routes the formatted registration message to the HLR 108 associated with the mobile terminal 102. Advantageously, in accordance with the present invention, the access specific roaming information (the registration message) is sent over a public IP network, such as the network 116. The HLR 108 employs a similar process in responding to the received registration message. In effect, the HLR 108 either validates or denies the registration request.

In responding to the received registration message, the registration message is sent to the HLR 108. The HLR 108 decrypts and deciphers the message and either validates or denies the registration request. The HLR 108 generates an appropriate response message which is formatted in the AAA protocol including the AAA protocol encryption. The encrypted response message is transmitted over the public IP network 116 to the visited access network 104. The encrypted response message is routed to the AAA-F 118 server which routes the encrypted message to the ACS/VLR 122 where the response message is decrypted. Based on the response message content, the visiting access network 104 either provides service to the mobile terminal 102 or denies service.

In a second example, the mobile terminal 102 is in the visited network 104 which has a roaming agreement with the home network 106, however, in this situation, routing information for the mobile terminal 102 is not contained in the AAA-F 118. The mobile terminal 102 initially registers in the visited network 104 by any appropriate means. The ACS/VLR 122 assembles an ANSI-41 registration, and/or authentication, message in the AAA protocol format with AAA protocol encryption. The formatted and encrypted registration message is sent to the AAA-F 118. Using the NAI field of the AAA protocol, the AAA-F 118 routes the registration message to an AAA-B, such as the AAA-B 120, which contains routing information for the HLR 108 of the mobile terminal 102. Based on this routing information, the AAA-B 120 routes the registration message to the HLR 118. The HLR 118 validates or denies the registration request using a similar process. Alternatively, the AAA-B 120 may act as a type of redirect server and provide instructions to the AAA-F 118 how to forward the message.

Figure 3:
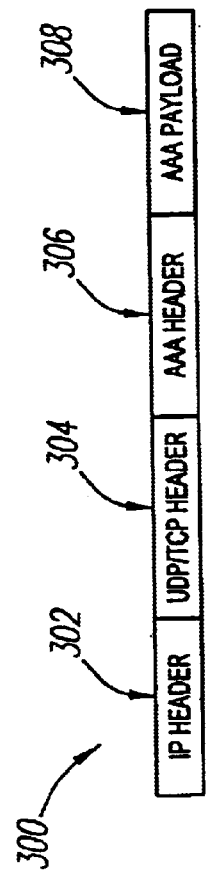
FIG. 3 is a graphical representation of a message format which may be advantageously employed in accordance with the present invention.

The AAA protocol, for example DIAMETER, is typically built up in a very transparent way, focusing on a reliable transport, as well as hop-by-hop and/or end-to-end security. A typical layout of a message 300 in the AAA protocol is shown in FIG. 3. The message 300 contains an Internet Protocol (IP) header 302 which is used to route the message 300 between the AAA servers 118, 120 and 110. A user datagram protocol/transmission control protocol (UDP/TCP) header 304 may be provided next to the IP header 302. A AAA header 306 contains information used for routing of the message 300 between the various AAA servers, such as AAA servers 118, 120 and 110. An example of the AAA header 306, or such an information field, is the Network Access Identifier (NAI), as specified by the Internet Engineering Task Force (IETF).

A AAA payload 108 typically carries a registration/authentication message to be used for access authentication. Alternatively, in accordance with the present invention, application specific information may be carried in the AAA payload 308. The AAA payload 308 could, for example, contain messages inherited from MAP/ANSI-41. Encryption may be applied to the AAA payload 308 and/or to the AAA header 306. The encryption applied to the AAA payload 308 would be end-to-end encryption while encryption applied to the AAA header 306 would be hop-by-hop encryption, whereby each AAA server decrypts the AAA header 306 field.

It should be noted that for appropriate routing of the message 300, a NAI has to be constructed by the ACS/VLR 122. The construction of the NAI must be done so that the network 109 of the home access provider (the home network 106) may be found through established roaming agreements. One method may be to use an International Mobile Subscriber Identity (IMSI). Using the IETF syntax of NAI, the format could for example be:

<Significant digits of IMSI>@wirelessdomain.net

The significant digits of IMSI are the digits needed to uniquely identify a HLR and/or a wireless provider. The wirelessdomain.net could be a domain name jointly used by a set of roaming wireless access providers. This domain name could be used to point out the broker AAA server administrating the roaming agreements.

For the example given above wherein the AAA-F 118 contains roaming information regarding the mobile terminal 102, the AAA-F 118 would analyze the received IMSI digits in the NAI and though internal tables locate the appropriate AAA-H 110. For the example wherein the AAA-F 118 did not contain roaming information for the mobile terminal 102, the AAA-F 118 would only need to conclude using internal tables that a specific AAA-B has to be used. The specific AAA-B would be identified based on wirelessdomain.net.

In another aspect of the present invention, application specific information is transmitted over the public IP network 116 using the existing AAA protocol infrastructure. Users subscribe to different applications. For example, some users may subscribe to voice over IP service while others do not. Internet service providers (ISPs) or the like therefore need to authenticate a user before providing specific applications, or services, to the user. In accordance with an aspect of the present invention, the application specific authentication information may be transmitted from the user to the application home network 132 using a process similar to that discussed above.

For purposes of application specific information, the AS 130 communicates using the AAA network (AAA-F 118 and AAA-B 120) and the public IP network 116 with the application home network 132 and more particularly, the AHS 134. Application specific information, such as authentication information, is assembled in an AAA protocol format with AAA protocol encryption by the AS 130. The AS 130 then transmits the encrypted application specific data to the AAA-F 118 in the visiting access network 104. The application specific information may be formatted as described above with respect to access specific information. The AAA-F 118 transmits the encrypted application specific information over the public IP network 116 to one or more AAA-B 120, if necessary, then to the AHS 134. The AHS 134 validates or denies the authentication request for an application using a similar process.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A wireless communications system comprising:
   a visited network including a Visitors Location Register (VLR) that generates a Mobile Application Part (MAP) message, and encapsulates said MAP message according to an access independent protocol; and
   an access independent authentication server (AAA-F) communicatively connected to said VLR for receiving said encapsulated MAP message from said VLR, and routing said encapsulated MAP message over a public IP network to a subscriber's home network.

2. The communications system of claim 1 wherein said AAA-F routes said encapsulated MAP message via a broker (AAA-B).

3. The communications system of claim 1 wherein said subscriber's home network includes a Home Location Register (HLR), and wherein said AAA-F routes said encapsulated MAP message to said HLR.

4. The communications system of claim 3 wherein said HLR is operable to transmit and receive said encapsulated MAP messages according to said access independent protocol.

5. The communications system of claim 4 wherein said HLR is further operable to encipher and decipher said encapsulated MAP messages according to said access independent protocol.

6. The communications system of claim 1 wherein said visited network further includes an application server (AS) for generating and encapsulating an authentication message for transmission to an Application Home Server (AHS) in said subscriber's home network according to said access independent protocol.

7. The communications system of claim 6 wherein said AAA-F receives said encapsulated authentication message from said AS, and routes said encapsulated authentication message over said public IP network to said AHS.

8. The communications system of claim 7 wherein said AAA-F routes said encapsulated authentication message to said AHS via a broker (AAA-B).

9. The communications system of claim 8 wherein said AHS is operable to transmit and receive said encapsulated authentication message according to said access independent protocol.

10. The communications system of claim 9 wherein said AHS is further operable to encipher and decipher said encapsulated authentication message according to said access independent protocol.

11. The communication system of claim 1 wherein said visited network and said subscribe's home network are CDMA networks.

12. The communication system of claim 1 wherein said MAP message is an ANSI-41 registration message.

13. The communication system of claim 1 wherein said MAP message is an ANSI-41 authentication message.

14. The communications system of claim 1 wherein said access independent protocol includes an AAA protocol.

15. The communications system of claim 14 wherein said AAA protocol is a DIAMETER protocol.

16. A method of communicating messages in a wireless communications system, the method comprising:
    generating a MAP message at a VLR in a visited network;
    encapsulating said MAP message at said VLR according to an access independent protocol;
    forwarding said encapsulated MAP message to an AAA-F server communicatively connected to said VLR;
    communicating over a public IP network, said encapsulated MAP message from said AAA-F server to a subscriber's home network; and
    receiving a response to said formatted message.

17. The method of claim 16 wherein encapsulating said MAP message according to an access independent protocol comprises encrypting said MAP message according to AAA protocol encryption.

18. The method of claim 17 wherein encapsulating said MAP message according to an access independent protocol further comprises including a Network Access Identifier (NAI).

19. The method of claim 18 wherein communicating said encapsulated MAP message from said AAA-F server includes routing said encapsulated MAP message to a HLR in said subscriber's home network based on said NAI.

20. The method of claim 19 wherein communicating said encapsulated MAP message from said AAA-F server further includes routing said encapsulated MAP message to said HLR via a broker.

21. The method of claim 20 further comprising said broker providing instructions to said AAA-F on how to forward said formatted message to said HLR.

22. The method of claim 21 further comprising decrypting and deciphering at said HLR said encapsulated MAP message.

23. The method of claim 22 further comprising generating, at said HLR, a response to said encapsulated MAP message, formatting said response according to said access independent protocol, and transmitting said formatted response to said VLR.

* * * * *